(12) United States Patent
Koyata et al.

(10) Patent No.: US 8,168,701 B2
(45) Date of Patent: May 1, 2012

(54) CONCRETE OR MORTAR ADMIXTURE COMPOSITION

(75) Inventors: Hideo Koyata, Atsugi (JP); Miho Miyakawa, Atsugi (JP)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 12/988,845

(22) PCT Filed: Apr. 22, 2009

(86) PCT No.: PCT/JP2009/058423
§ 371 (c)(1),
(2), (4) Date: Oct. 21, 2010

(87) PCT Pub. No.: WO2009/131240
PCT Pub. Date: Oct. 29, 2009

(65) Prior Publication Data
US 2011/0046270 A1 Feb. 24, 2011

(30) Foreign Application Priority Data
Apr. 24, 2008 (JP) ................................. 2008-114055

(51) Int. Cl.
*C04B 24/26* (2006.01)
*C08K 3/00* (2006.01)
(52) U.S. Cl. ............................................... 524/5; 524/4
(58) Field of Classification Search .................. 524/5
See application file for complete search history.

(56) References Cited

U.S. PATENT DOCUMENTS

| | | | |
|---|---|---|---|
| 5,175,278 A | 12/1992 | Peik et al. | |
| 6,068,697 A | 5/2000 | Yamamuro et al. | |
| 6,106,603 A | 8/2000 | Skaggs et al. | |
| 6,110,271 A | 8/2000 | Skaggs et al. | |
| 6,117,226 A | 9/2000 | Dial et al. | |
| 6,166,119 A | 12/2000 | Matsuo et al. | |
| 6,221,152 B1 | 4/2001 | Dial et al. | |
| 6,309,445 B1 | 10/2001 | Gittleman et al. | |
| 6,670,415 B2 | 12/2003 | Jardine et al. | |
| 2004/0072939 A1 | 4/2004 | Cornman et al. | |
| 2007/0039516 A1* | 2/2007 | Bandoh | 106/12 |
| 2008/0156225 A1* | 7/2008 | Bury | 106/14.05 |

FOREIGN PATENT DOCUMENTS

| | | | |
|---|---|---|---|
| JP | 9-40447 A | | 2/1997 |
| JP | 09040447 A | * | 2/1997 |
| JP | 2001-19518 A | | 1/2001 |
| JP | 2001-247347 A | | 9/2001 |
| JP | 2001247347 A | * | 9/2001 |
| JP | 2008-184344 A | | 8/2008 |
| WO | 99/44966 | | 9/1999 |
| WO | WO 9944966 A1 | * | 9/1999 |

OTHER PUBLICATIONS

Translation of JP 09-040447, Feb. 10, 1997.*
Translation of JP 2001-247347, Sep. 11, 2001.*
Form PCT/ISA/210, International Search Report, PCT/JP2009/058423, 7pp., 2009.
Form PCT/ISA/237, Written Opinion of the International Searching Authority, PCT/JP2009/058423, 6pp,, 2009.
Form PCT/IPEA/409, International Preliminary Report on Patentability, PCT/JP2009/058423, 7pp., 2009.

* cited by examiner

*Primary Examiner* — Ling Choi
*Assistant Examiner* — Hui Chin
(74) *Attorney, Agent, or Firm* — Craig K. Leon; Stephan P. Williams

(57) ABSTRACT

A concrete admixture composition concurrently using (A) a polycarboxylic acid type water-reducing agent for concrete, (B) a hydroxycarboxylic acid type water-reducing agent for concrete, and (C) a polysaccharide type thickening agent is offered, with the view to manufacture a high-performance and multi-functional concrete excelling in high fluidity, freshness retention, early strength, pumpability, material segregation resistance and anti-washout properties under water.

8 Claims, No Drawings

CONCRETE OR MORTAR ADMIXTURE COMPOSITION

TECHNICAL FIELD

This invention relates to a concrete or mortar admixture composition which is necessary for preparation of a high performance, multi-functional concrete or mortar having excellent fluidity, freshness retention, early strength, pumpability, material segregation resistance, and anti-washout properties under water.

BACKGROUND ART

Concrete admixture compositions are used for the preparation of concrete having anti-washout properties under water, for which self-levelling property is important, for example, used for underwater concrete or for tunnel construction. In order to maintain the properties of a fresh concrete or fresh mortar in good condition, it is necessary to concurrently use a thickening agent. Where conventional thickening agents, for example, methyl cellulose type thickening agent is used, sufficient early strength of the concrete cannot be obtained due to the heavy setting retardation. Also when a pseudo-polymer type thickening agent formed by electrostatic association of two kinds of surfactants is used (e.g., Patent Document 1, Patent Document 2), the resulting concrete has high viscosity and shows poor pumpability. On the other hand, polysaccharide type thickening agents generally are in powdered form and manually added into the mixers, which renders precise control of addition of their minor amount difficult. Moreover, when the thickening agent is used without complete dissolution of the polysaccharide particles, dissolution of the powder particles in the concrete takes time, and relatively longer mixing time is required for attaining the desired segregation-decreasing effect or thickening effect, calling for addition of an increased amount of the thickening agent, which is uneconomical.

PRIOR ART DOCUMENTS

Patent Documents

Patent Document 1: JP2003-277751A
Patent Document 2: JP2006-176397A

SUMMARY OF THE INVENTION

A concrete or mortar admixture composition necessary for the preparation of high performance, multi-functional concrete or mortar excelling in fluidity, freshness retention, early strength, pumpability, material segregation resistance and anti-washout properties under water is in demand.

According to the present invention, it is made possible to manufacture a concrete or mortar whose performance is satisfactory in all respects of fluidity, freshness retention, early strength, pumpability, material segregation resistance, and anti-washout properties under water, by adding to a concrete or mortar composition comprising cement, aggregate and water, (A) 0.1-1.5 wt % to the cement of a polycarboxylic acid type water-reducing agent for concrete, (B) 0.01-0.2 wt % to the cement of a hydroxycarboxylic acid type water-reducing agent for concrete, and (C) 0.001-1 wt % to the water of a polysaccharide type thickening agent.

DESCRIPTION OF EMBODIMENTS

A polycarboxylic acid type water-reducing agent for concrete signifies a carboxyl group-containing, comb-structured polymer in which the acid/polyoxyalkylene side chain molar ratio is at least 3.5. "Polycarboxylic acid" as referred to herein covers polymers of unsaturated carboxylic acids, preferred unsaturated carboxylic acids being acrylic acid, methacrylic acid, maleic acid, fumaric acid and mixtures thereof. Polymers in which monomer(s) other than unsaturated carboxylic acid is(are) copolymerized are also covered by this term. The "acid" said herein signifies the carboxylic acid or salt thereof in the molecular structures, while it also covers the sulfuric acid, phosphoric acid and salts thereof which are incorporated into the molecular structures where necessary, by means of polymerization. Also the "polyoxyalkylene" is selected from $C_{2-4}$ polyoxyalkylenes, which may be of single species or a mixture of two or more species. As the polyoxyalkylene side chain, straight chain polyethylene glycol is preferred, while it may be branched or polypropylene glycol may be present in the polyethylene glycol side chain in block(s) or at random. Where the acid/polyoxyalkylene side chain molar ratio is less than 3.5, not only longer slump development time is required, but also the slump retention tends to be impaired. Moreover, it also serves as a cause for stiffness of the concrete or mortar, which renders handling of the product difficult. The acid/polyoxyalkylene side chain molar ratio still preferably is at least 5, but there is a problem that the setting retardation becomes conspicuous with increase in the acid/polyoxyalkylene side chain molar ratio. Considering good balance therebetween, therefore, the optimum ratio is 5-7. Preferred molecular weight of the polycarboxylic acid polymer ranges 5,000-200,000, in particular, 10,000-100,000, which range corresponding to those of frequently used marketed products in general. The polycarboxylic acid polymer is not limited to a single kind, but two or more kinds may be blended. Where its added amount is less than 0.1 wt %, sufficient fluidity cannot be imparted, while when it exceeds 1.5 wt %, such adverse effects as segregation or setting retardation are brought about. Accordingly, use of 0.2-1 wt %, in particular, 0.3-0.8 wt % is preferred.

As hydroxycarboxylic acid type water-reducing agent for concrete, use of one or more members selected from the group consisting of gluconic acid, glucoheptonic acid, citric acid, hydroxymalonic acid, tartaric acid, saccharic acid, and salts of these acids in preferred. Considering the wide utility as an admixture for concrete or mortar and economical aspect concurrently, use of sodium gluconate is most preferred. Hydroxycarboxylic acid has the effect of not only imparting slump retention but also of removing stiffness. Where its addition rate is less than 0.01 wt %, sufficient slump retention cannot be accomplished and may cause stiffness, and such an amount is hardly regarded sufficient. When it exceeds 0.2 wt %, on the other hand, notable setting retardation results. Therefore its use at a rate of 0.03-0.15 wt %, in particular, 0.04-0.1 wt %, is desirable.

For the polysaccharide contemplated for use in the invention, use of one or more members selected from the group consisting of diutan gum, welan gum, guar gum, tamarind gum, locust bean gum and xanthan gum is preferred. From the standpoints of setting retardation, rheology, strength development and thickening activity, diutan gum and welan gum are preferred, diutan gum being the most preferred. Polysaccharide can be used retaining its powder form, but is preferably used as completely dissolved in water in advance. Where it is added at a rate less than 0.001 wt % to the water, sufficient material segregation resistance and anti-washout properties under water cannot be obtained, while economical merit is lost when it is added at a rate exceeding 1 wt %. Accordingly, its use at a rate of preferably 0.01-0.5 wt %, in particular, 0.1-0.3 wt %, is desirable.

Those three agents: (A) polycarboxylic acid type water-reducing agent for concrete, (B) hydroxycarboxylic acid type water-reducing agent for concrete, and (C) polysaccharide type thickening agent, may be added separately, while it is also permissible to any two of them or all three of them may be mixed in advance. The order or method of their addition is subject to no particular limitation.

This invention is applicable to any concrete or mortar compositions composed mainly of cement, without any particular limitation. Ordinary concrete has a unit powder amount of 250-1,000 kg/m$^3$ (10-50 wt %), but for attaining the intended performance in the present invention, use of the powder at relatively higher quantitative region, preferably 400-800 kg/m$^3$ (15-40 wt %), in particular, 500-800 kg/m$^3$ (20-40 wt %) is desirable. As the cement to be used herein, besides Portland cements such as ordinary Portland cement, rapid-hardening Portland cement, moderate heat Portland cement, sulfate resisting Portland cement and white Portland cement; and mixed cements such as blast furnace cement, fly ash cement and silica cement can be named. Other than these cements, furthermore, one or more of such powders as fine calcium carbonate powder, fly ash, blast furnace slag, silica fume and the like can substitute cement. The powder used in the present invention signifies mixtures of cement with these powders.

It is also possible to concurrently use other admixtures such as AE reagent, retardant, rapid-hardening agent, accelerator, foaming agent, defoaming agent, shrinkage reducing agent, expansive additives and the like, or other thickening agent.

The unit amount of water for manufacture of the concrete used in this invention is within a range of 140-240 kg/m$^3$ (14-24 wt %), while it is preferred to use it within a range of 150-200 kg/m$^3$ (15-20 wt %), from the standpoint of durability and workability. In this case the water/powder ratio is within a range of 0.2-0.8. The water/powder ratio for manufacture of the mortar also is selected from this range.

The concrete to be used in the present invention is formed by blending coarse aggregate such as gravel with mortar. The unit volume of coarse aggregate is selected from a range of 0.28-0.40 m$^3$/m$^3$, while it is preferred to select it from a range of 0.30-0.35 m$^3$/m$^3$ from the standpoint of workability and quality of hardened concrete.

EXAMPLES (A) Polycarboxylic acid type water-reducing agents for concrete, which were used in the following Examples The following 5 kinds of marketed polycarboxylic acid type polymers were used. Their chemical analysis confirmed that all of them were polymethacrylic acid type, comb-structured polycarboxylic acid polymers having ethylene oxide side chains. The particulars of their chemical composition were as follows.

PC-1: acid/PEG side chain molar ratio=5.1, average molecular weight=49,300, molecular weight of ethylene oxide side chains=3,400

PC-2: acid/PEG side chain molar ratio=3.7, average molecular weight=40,200, molecular weight of ethylene oxide side chains=2,000

PC-3: acid/PEG side chain molar ratio=3.4, average molecular weight=52,200, molecular weight of ethylene oxide side chains=3,600

PC-4: acid/PEG side chain molar ratio=2.7, average molecular weight=30,900, molecular weight of ethylene oxide side chains=2,000

PC-5: acid/PEG side chain molar ratio=2.0, average molecular weight=27,600, molecular weight of ethylene oxide side chains=2,000

(B) hydroxycarboxylic acid type water-reducing agents for concrete, which were used in the following Examples Commercially available sodium gluconate reagent and citric acid reagent (both manufactured by Wako Pure Chemical Industries) were used.

(C) polysaccharide type thickening agents which were used in the following Examples Commercially available Diutan Gum and Welan Gum (both manufactured by CP Kelco) were used.

For Examples 1-8 and Comparative Examples 1-8, a mortar of the following composition was milled. The admixture compositions used in those Examples were (A) polycarboxylic acid-type water-reducing agent for concrete and (B) hydroxycarboxylic acid type water-reducing agent for concrete were mixed into a single package solution (A+B) and a solution formed by advance complete dissolution of (C) polysaccharide type thickening agent in water, which were added simultaneously with mixing water. Compositions of the admixtures used are shown in Table 1, and the test results are shown in Table 2, in which the added amounts of the admixtures are indicated in terms of the solid content.

Cement (C): 540 kg/m$^3$, rapid-hardening Portland cement (Sumitomo Osaka Cement Co.; density=3.13 g/cm$^3$)

Fine limestone powder (LP): 80 kg/m$^3$ (Joetsu Kogyo K.K.)

Fine aggregate (S): 512 kg/m$^3$, Ooi River sand (FM 2.74)

Water (W): 189 kg/m$^3$, city water

Water/powder ratio (W/(C+LP)): 0.305

The particulars of the test items were as follows;

Slump flow measurement: mortar spreading as measured following JIS A1173

Anti-washout properties under water: degree of separation in water as measured by the mass of suspended substances following JSCE-D104-2007

Stiffness: stiffness of mortar as observed after 60 minutes of its preparation

Pumpability: At the bottom of a 100 mmϕ×20 mm iron cylinder a 10 mmϕ hole was bored and a 5 kg weight was laid on the top of the cylinder. The amount of mortar discharge (%) transferred under the pressure in 5 minutes was measured. The mortars used in the test were those after 60 minutes of the preparation.

24 hours' strength: compressive strength as measured following JIS RS201.

All of the above tests were carried out in the environment at 20° C. and under relative humidity of 60%. A defoaming agent was added to all of the tested mortar blends to eliminate the effect of residual air therein, and it was confirmed that their air content was invariably no more than 2%.

Examples 9-10 and Comparative Examples 9-13

Those typical of the mortar experiments were selected and their effect was confirmed by means of the experiments with concrete. The compositions of the admixtures used are shown in Table 3, and the results of the experiments are shown in Table 4.

Cement (C): 540 kg/m$^3$, rapid-hardening Portland cement (Sumitomo Osaka Cement Co., density=3.13 g/cm$^3$)

Fine limestone powder (LP): 80 kg/m$^3$ (Joetsu Kogyo K.K.)

Fine aggregate (S): 512 kg/m$^3$, Ooi River sand (FM 2.74)

Coarse aggregate (G): 969 kg/m$^3$, crushed stone from Oume 2005 (FM 6.58)

Water (W): 196 kg/m³ city water
Water/powder ratio (W/(C+LP)): 0.316
The particulars of the test items were as follows:
Slump flow measurement: concrete spreading as measured following JIS A1101
Anti-washout properties under water: degree of separation in water as measured by the mass of suspended substances following JSCE-D104-2007
Stiffness: stiffness of mortar as observed after 60 minutes of its preparation
Pumpability: Concrete after 60 minutes of its preparation was shieved with 5 mm-sieve to be removed of the coarse aggregate, and the remaining portion was recovered and subjected to the experiment same to the mortar experiment.
24 hours' strength: compressive strength as measured following JIS A1108.

All of the above tests were carried out in the environment at 20° C. under relative humidity of 60%. A defoaming agent was added to all of the tested concretes to eliminate the effect of residual air therein, and it was confirmed that their air content was invariably no more than 2%.

EFFECT OF THE INVENTION

As demonstrated by the results of the foregoing experiments, it was confirmed by the mortar experiments and concrete experiments that the use of the three agents of (A) polycarboxylic acid type water-reducing agent for concrete, (B) hydroxycarboxylic acid type water-reducing agent for concrete, and (C) polysaccharide type thickening agent enables the products to exhibit satisfactory performance in all respects of high fluidity, freshness retention, early strength, pumpability, material segregation resistance and anti-washout properties under water.

TABLE 1

| | Composition of Admixture | | | | |
|---|---|---|---|---|---|
| | (A) Polycarboxylic acid type water-reducing agent (C × %) | (B) Hydroxycarboxylic acid type water-reducing agent (C × %) | (C) Polysaccharide type thickening agent (W × %) | Other water-reducing agent (C × %) | Other thickening agent (W × %) |
| Example 1 | PC-1 (0.70%) | sodium gluconate (0.10%) | diutan gum homogeneous solution (0.15%) | — | — |
| Example 2 | PC-1 (0.70%) | sodium gluconate (0.05%) | diutan gum homogeneous solution (0.15%) | — | — |
| Example 3 | PC-1 (0.50%) | sodium gluconate (0.10%) | diutan gum homogeneous solution (0.15%) | — | — |
| Example 4 | PC-1 (0.70%) | sodium citrate (0.10%) | diutan gum homogeneous solution (0.15%) | — | — |
| Example 5 | PC-1 (0.70%) | sodium gluconate (0.10%) | diutan gum homogeneous solution (0.25%) | — | — |
| Example 6 | PC-1 (0.70%) | sodium gluconate (0.10%) | diutan gum homogeneous solution (0.10%) | — | — |
| Example 7 | PC-1 (0.70%) | sodium gluconate (0.10%) | welan gum homogeneous solution (0.15%) | — | — |
| Example 8 | PC-2 (0.70%) | sodium gluconate (0.10%) | diutan gum homogeneous solution (0.15%) | — | — |
| Comparative Example 1 | PC-3 (0.70%) | sodium gluconate (0.10%) | diutan gum homogeneous solution (0.15%) | — | — |
| Comparative Example 2 | PC-4 (0.70%) | sodium gluconate (0.10%) | diutan gum homogeneous solution (0.15%) | — | — |
| Comparative Example 3 | PC-5 (0.70%) | sodium gluconate (0.10%) | diutan gum homogeneous solution (0.15%) | — | — |
| Comparative Example 4 | PC-1 (0.70%) | — | diutan gum homogeneous solution (0.15%) | — | — |

TABLE 1-continued

Composition of Admixture

| | (A) Polycarboxylic acid type water-reducing agent (C × %) | (B) Hydroxycarboxylic acid type water-reducing agent (C × %) | (C) Polysaccharide type thickening agent (W × %) | Other water-reducing agent (C × %) | Other thickening agent (W × %) |
|---|---|---|---|---|---|
| Comparative Example 5 | PC-1 (0.70%) | sodium gluconate (0.10%) | diutan gum powder (0.15%) | — | — |
| Comparative Example 6 | PC-1 (0.70%) | sodium gluconate (0.10%) | diutan gum powder (0.30%) | — | — |
| Comparative Example 7 | PC-1 (0.15%) | sodium gluconate (0.10%) | diutan gum homogeneous solution (0.15%) | — | — |
| Comparative Example 8 | — | — | — | Kao Mighty 3000H (0.70%) | Kao Visco Top 100 (8.0%, liquid base) |

TABLE 2

Results of Experiments with Mortar

| | Slump flow (mm) | | | | Fluidity Retention | Anti-washout properties under water | Stiffness | Pumpability | 24 Hours' strength (N/mm$^2$) |
|---|---|---|---|---|---|---|---|---|---|
| | 4 min. | 60 min. | 120 min. | 180 min. | | | | | |
| Example 1 | 390 | 380 | 385 | 360 | ⊙ | ⊙ | ⊙ | ⊙ | 29.6 |
| Example 2 | 400 | 365 | 345 | 315 | ○ | ⊙ | ⊙ | ⊙ | 30.8 |
| Example 3 | 385 | 350 | 280 | 260 | ○ | ⊙ | ⊙ | ⊙ | 27.6 |
| Example 4 | 385 | 370 | 365 | 350 | ⊙ | ⊙ | ⊙ | ⊙ | 28.8 |
| Example 5 | 365 | 345 | 325 | 310 | ⊙ | ⊙ | ⊙ | ⊙ | 27.5 |
| Example 6 | 375 | 320 | 315 | 305 | ⊙ | ○ | ⊙ | ⊙ | 28.2 |
| Example 7 | 355 | 318 | 325 | 300 | ⊙ | ⊙ | ⊙ | ⊙ | 26.7 |
| Example 8 | 420 | 397 | 365 | 348 | ⊙ | ⊙ | ⊙ | ⊙ | 30.1 |
| Comparative Example 1 | 345 | 290 | 235 | 200 | X | ⊙ | X | ⊙ | 26.9 |
| Comparative Example 2 | 390 | 330 | 305 | 265 | ○ | ⊙ | X | ⊙ | 26.7 |
| Comparative Example 3 | 355 | 320 | 250 | 225 | ○ | ⊙ | X | ⊙ | 27.2 |
| Comparative Example 4 | 435 | 350 | 320 | 265 | ○ | ⊙ | X | ⊙ | 25.8 |
| Comparative Example 5 | 405 | 370 | 365 | 330 | ⊙ | X | ⊙ | ⊙ | 28.3 |
| Comparative Example 6 | 382 | 360 | 348 | 310 | ⊙ | ○ | ⊙ | ○ | 26.5 |
| Comparative Example 7 | 335 | 270 | 220 | 120 | X | ⊙ | ○ | ○ | 26.0 |
| Comparative Example 8 | 363 | 360 | 348 | 345 | ⊙ | ⊙ | ⊙ | X | 26.0 |

Fluidity retention:
⊙ (excellent, flow retention after 180 minutes was no less than 80%)
○ (good, flow retention after 180 minutes was 60-79%)
X (poor, flow retention after 180 minutes was no more than 59%)
Anti-washout properties under water:
⊙ (excellent, mass of suspended substances was no more than 50 mg/L)
○ (good, mass of suspended substances was 51-500 mg/L)
X (poor, mass of suspended substances was no less than 501 mg/L)
Stiffness:
⊙ (nil)
○ (nearly none, fluidity restored upon soft agitation)
X (present, powerful agitation was required for restoring fluidity)
Pumpability:
⊙ (excellent, pumpability index no less than 80%)
○ (good, pumpability index, 30-80%)
X (poor, pumpability index, no more than 20%)

TABLE 3

Composition of Admixture

|  | (A) Polycarboxylic acid type water-reducing agent (C × %) | (B) Hydroxycarboxylic acid type water-reducing agent (C × %) | (C) Polysaccharide type thickening agent (W × %) | Other water-reducing agent (C × %) | Other thickening agent (W × %) |
|---|---|---|---|---|---|
| Example 9 | PC-1 (0.70%) | sodium gluconate (0.10%) | diutan gum homogeneous solution (0.15%) | — | — |
| Example 10 | PC-2 (0.70%) | sodium gluconate (0.10%) | diutan gum homogeneous solution (0.15%) | — | — |
| Comparative Example 9 | PC-3 (0.70%) | sodium gluconate (0.10%) | diutan gum homogeneous solution (0.15%) | — | — |
| Comparative Example 10 | PC-4 (0.70%) | sodium gluconate (0.10%) | diutan gum homogeneous solution (0.15%) | — | — |
| Comparative Example 11 | PC-5 (0.70%) | sodium gluconate (0.10%) | diutan gum homogeneous solution (0.15%) | — | — |
| Comparative Example 12 | PC-1 (0.70%) | — | diutan gum homogeneous solution (0.15%) | — | — |
| Comparative Example 13 | — | — | — | Kao Mighty 3000H (0.70%) | Kao Visco Top 100 (8.0%, liquid base) |

TABLE 4

Results of Experiments with Concrete

|  | Slump flow (mm) | | | | Fluidity retention | Anti-washout properties under water | Stiffness | Pumpability | 24 Hours' strength (N/mm$^2$) |
|---|---|---|---|---|---|---|---|---|---|
|  | 4 min. | 60 min. | 120 min. | 180 min. |  |  |  |  |  |
| Example 9 | 685 | 660 | 635 | 610 | ⊙ | ⊙ | ⊙ | ⊙ | 25.5 |
| Example 10 | 700 | 665 | 630 | 600 | ⊙ | ⊙ | ⊙ | ⊙ | 23.8 |
| Comparative Example 9 | 680 | 580 | 460 | 350 | X | ⊙ | X | ⊙ | 22.9 |
| Comparative Example 10 | 685 | 630 | 555 | 485 | ◯ | ⊙ | X | ◯ | 22.6 |
| Comparative Example 11 | 690 | 615 | 525 | 440 | ◯ | ⊙ | X | ⊙ | 23.0 |
| Comparative Example 12 | 700 | 635 | 540 | 450 | ◯ | ⊙ | X | ⊙ | 22.1 |
| Comparative Example 13 | 680 | 615 | 605 | 600 | ⊙ | ⊙ | ⊙ | X | 21.9 |

Fluidity retention:
⊙ (excellent, flow retention after 180 minutes was no less than 80%)
◯ (good, flow retention after 180 minutes was 60-79%)
X (poor, flow retention after 180 minutes was no more than 59%)
Anti-washout properties under water:
⊙ (excellent, mass of suspended substances was no more than 50 mg/L)
◯ (good, mass of suspended substances was 51-500 mg/L)
X (poor, mass of suspended substances was no less than 501 mg/L)
Stiffness:
⊙ (nil)
◯ (nearly none, fluidity restored upon soft agitation)
X (present, powerful agitation was required for restoring fluidity)
Pumpability:
⊙ (excellent, pumpability index no less than 80%)
◯ (good, pumpability index 30-80%)
X (poor, pumpability index no more than 20%)

INDUSTRIAL UTILIZABILITY

The addition according to the present invention of a polycarboxylic acid type water-reducing agent for concrete, hydroxycarboxylic acid type water-reducing agent for concrete, and polysaccharide type thickening agent to a concrete or mortar composition consisting of cement, aggregate and water enables manufacture of concrete or mortar which shows satisfactory performance in all respects of high fluidity, freshness retention, early strength, pumpability, material segregation resistance and anti-washout properties under water.

The invention claimed is:

1. An admixture composition for modifying concrete or mortar, comprising:
   (A) a polycarboxylic acid water-reducing polymer agent having an acid/polyoxyalkylene side chain molar ratio of at least 3.5;
   (B) a hydroxycarboxylic acid water-reducing agent selected from the group consisting of gluconic acid, glucoheptonic acid, citric acid, hydroxymalonic acid, tartaric acid, saccharic acid, and salts thereof; and
   (C) a polysaccharide thickening agent selected from the group consisting of diutan gum, welan gum, guar gum, tamarind gum, locust bean gum and xanthan gum.

2. The admixture composition of claim 1 wherein said molar ratio is at least 5.

3. The admixture composition of claim 2 wherein said molar ratio is 5-7.

4. The admixture composition of claim 1 wherein said polysaccharide thickening agent is diutan gum.

5. The admixture composition of claim 1 wherein said polysaccharide thickening agent is welan gum.

6. Method for manufacturing a concrete or mortar, comprising: introducing to cement, aggregate, and water the admixture composition of claim 1 wherein said polycarboxylic acid-containing water-reducing polymer of component (A) is used in the amount of 0.1-1.5 wt % based on cement, said hydroxycarboxylic acid water-reducing agent of component (B) is used in the amount of 0.01-0.2 wt % based on cement; and said polysaccharide thickening agent is used in the amount of 0.01-0.5 wt % based on said water.

7. The method of claim 6 wherein two or more of said components (A) through (C) are mixed in advance of introducing them into the concrete or mortar.

8. The method of claim 6 wherein said polysaccharide thickening agent is dissolved in water before addition of said admixture composition to mortar or concrete.

* * * * *